United States Patent [19]

Kobayashi

[11] Patent Number: 5,090,913
[45] Date of Patent: Feb. 25, 1992

[54] PORTABLE APPARATUS HAVING CABLE ELECTRICALLY CONNECTING DISPLAY UNIT AND BASE UNIT

[75] Inventor: Takaichi Kobayashi, Tokyo, Japan

[73] Assignee: Kabushiki Kaisha Toshiba, Kawasaki, Japan

[21] Appl. No.: 542,061

[22] Filed: Jun. 22, 1990

[30] Foreign Application Priority Data

Jun. 23, 1989 [JP] Japan .................... 1-162224

[51] Int. Cl.⁵ .............................................. G06F 1/00
[52] U.S. Cl. ................................. 439/165; 364/708; 16/337
[58] Field of Search ............. 439/164, 165; 364/708; 16/223, 337; 312/7.2; 248/917

[56] References Cited

U.S. PATENT DOCUMENTS

| | | | |
|---|---|---|---|
| 4,571,456 | 2/1986 | Paulsen et al. | 361/386 |
| 4,730,364 | 3/1988 | Tat-Kee | 16/337 |
| 4,864,523 | 9/1989 | Sasaki | 364/708 |

FOREIGN PATENT DOCUMENTS

225920 11/1985 Japan .................... 364/708

*Primary Examiner*—Gary F. Paumen
*Attorney, Agent, or Firm*—Cushman, Darby & Cushman

[57] ABSTRACT

A portable apparatus comprising a base unit and a display unit rotatably connected to the base unit. The base unit has a recess, and the display unit has a first leg portion mounted in the recess. The first leg portion comprises a rear leg segment conjoining a base unit. The first leg portion has a front leg segment fastened to the rear leg segment, defining a guide path between the front leg segment and the rear leg segment. The leg segments, fastened together, form a shaft having a guide path communicating with the guide path. An opening is formed in one of the side walls defining the sides of the recess and also in the wall defining the bottom of the recess, thus allowing access into the base unit. A support segment is removably fitted in this opening, supporting the shaft such that the shaft can rotate. The portable apparatus further comprises a flexible cable which extends from the base unit into the display unit, guided through the opening, the guide path.

21 Claims, 9 Drawing Sheets

PORTABLE APPARATUS HAVING CABLE ELECTRICALLY CONNECTING DISPLAY UNIT AND BASE UNIT

BACKGROUND OF THE INVENTION

1. Field of the Invention

The present invention relates to a portable apparatus such as a lap-top or portable computer and more particularly to a portable apparatus having a divided portion for suitably guiding a cable electrically connecting a base unit of the computer and a display unit connected to the base unit.

2. Description of the Related Art

U.S. Pat. No. 4,571,456 discloses a portable computer which comprises a base unit, a keyboard attached to the base unit, and a display unit hinged to the base unit by a hinge mechanism. The hinge mechanism connects the display unit to the base unit such that the display unit can be rotated between a closed position where it covers the keyboard and an opened position where it is held up from the keyboard. The hinge mechanism comprises two trunnions horizontally protruding within the housing of the display unit, from the side walls of this housing, and two bearings mounted on the trunnions. The bearings are fitted in the grooves formed in the top surface of the base unit.

The portable computer further comprises a flexible cable connecting the various components located within the base unit to the various components incorporated in the display unit. This cable extends through the hinge mechanism which connects the display unit to the base unit. More specifically, the cable extends from the base unit through the holes made in the bearings and having axes identical to those of the bearings, and further through the holes made in the housing of the display unit, into the display housing. Either bearing is mounted on the trunnion such that its hole is continuous to and coaxial with the hole of the display housing, so that it is easy to guide the cable out of the base unit into the housing of the display unit.

Recently there is a demand for portable computers which are more compact and, thus, more portable. To meet this demand, both the base unit and display unit need to be thin, and the hinge mechanism for connecting the display unit to the base unit must also be thin. As a result, the components of the hinge mechanism, such as bearings or trunnions, should be proportionally thin. The thinner the bearings, the smaller the diameter of their holes. The smaller the diameter of the holes, the more difficult it is to pass a cable through these holes, inevitably reducing the efficiency of assembling portable computers.

SUMMARY OF THE INVENTION

An object of the present invention is to provide a portable electronic apparatus, which facilitates the guidance of cable within the apparatus.

According to the invention, a portable apparatus comprises:
- a display unit including a leg portion having a cable guide path;
- a base unit including a top cover having a leg mounting portion, for mounting the leg portion, having a opening;
- a cover, for covering the opening, having a cable guide portion; and
- a cable, guided through the cable guide path and the cable guide portion, including a first end having a first connector electrically connecting to the display unit and a second end having a second connector electrically connecting to the base unit.

Additional objects and advantage of the invention will be set forth in the description which follows, and in part will be obvious from the description, or may be learned by practice of the invention. The object and advantage of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

Figure 1:
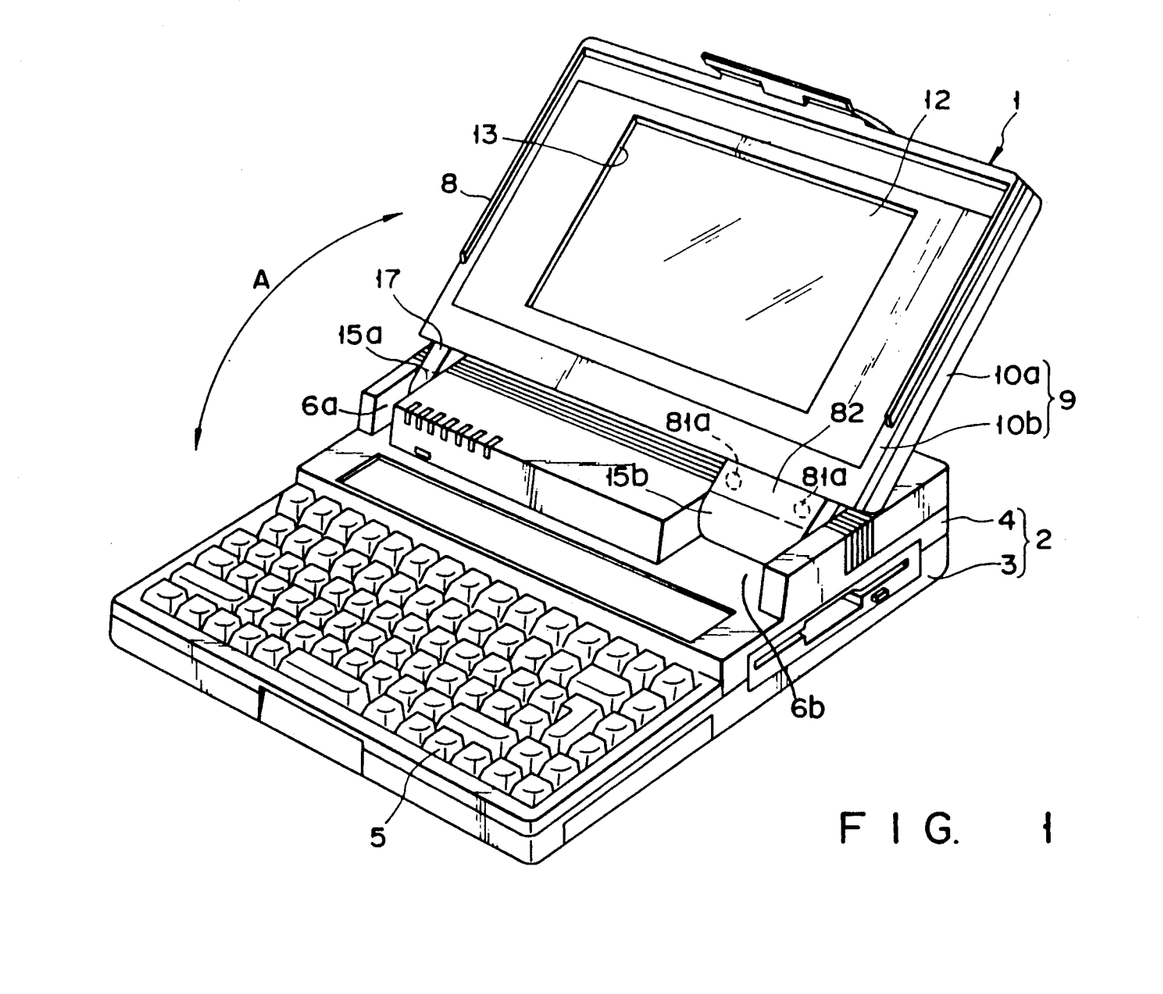
FIG. 1 is a perspective view illustrating a portable computer according to the invention.
Figure 3:
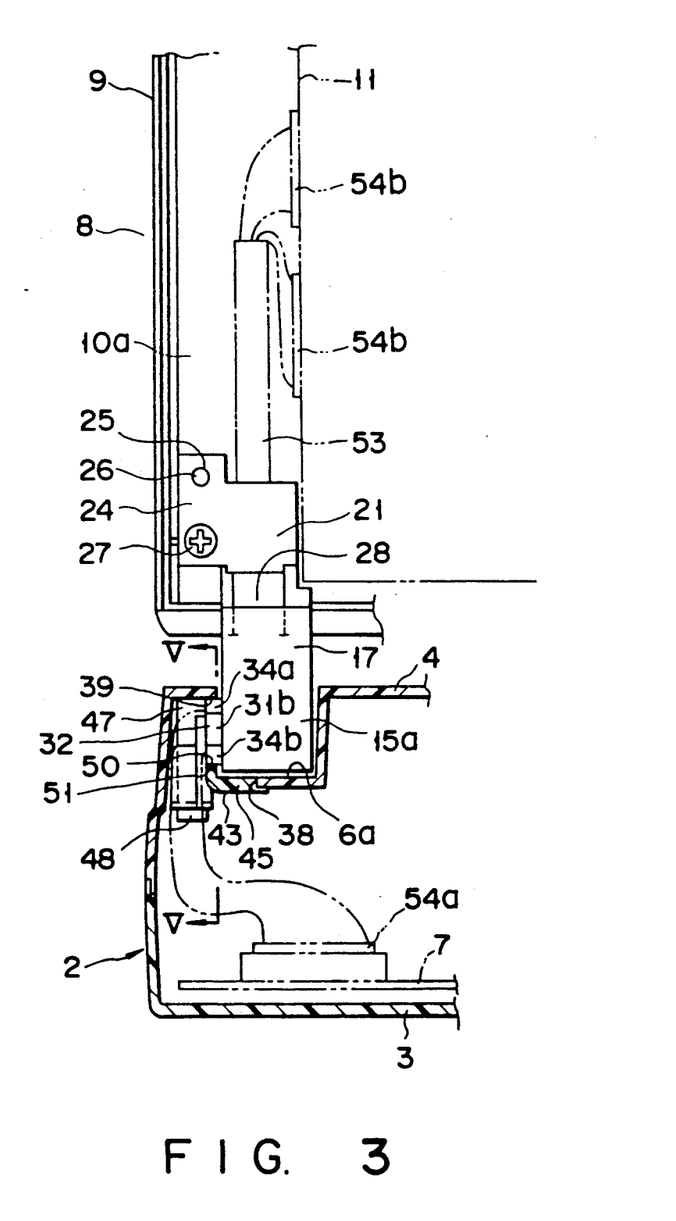
FIG. 3 is a sectional view schematically showing the first recess and the first leg portion.
Figure 4:
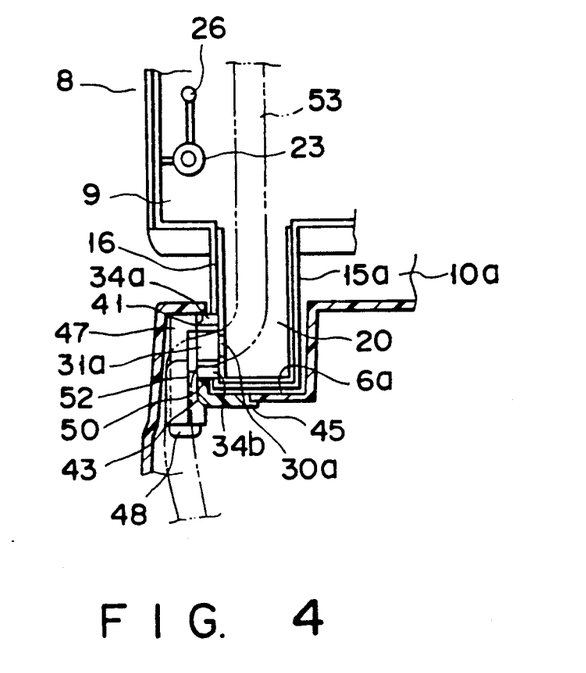
FIG. 4 is also a sectional view of the first recess and the first leg portion, illustrating a cable guided from the base unit into the display unit.
Figure 5:
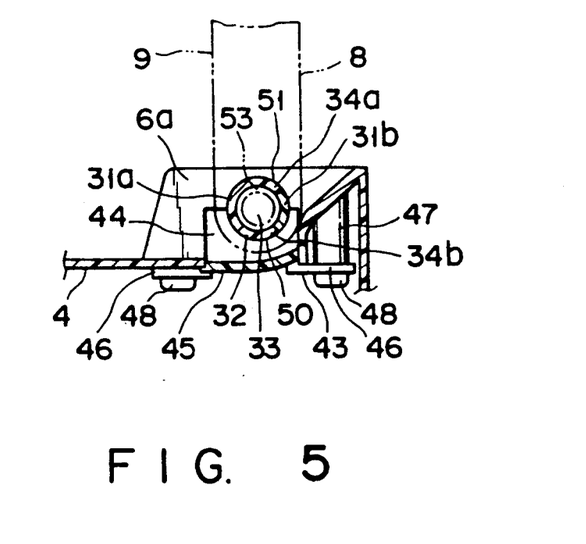
FIG. 5 is a sectional view, taken along line V—V in FIG. 3.
Figure 6:
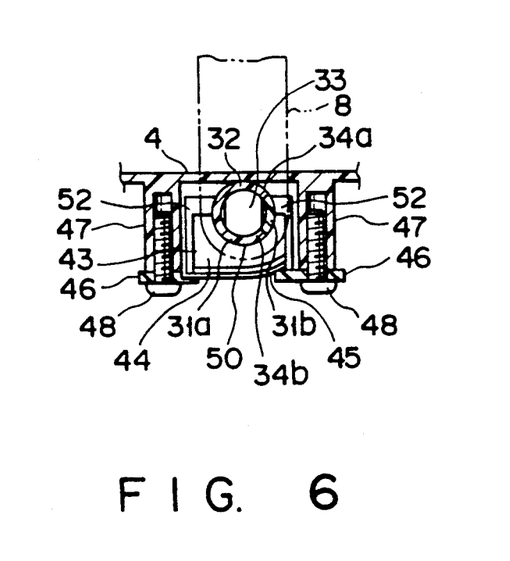
FIG. 6 is a sectional view showing, in detail, the shaft and associated components of the first recess and the first leg portion illustrated in FIGS. 2 and 3.

FIG. 1 illustrates a lap-top computer 1. Computer 1 has a base unit 2 made of a synthetic resin and shaped like a thin rectangular box comprising a bottom case 3 which is covered by a top cover 4. A keyboard 5 is attached to the front portion of bottom case 3. The front portion of base unit 2 is thinner than the rear portion of base unit 2. Top cover 4 has a first recess 6a in front left portion of top cover 4 and a second recess 6b in front right portion of top cover 4, respectively. As is shown in FIG. 3, a printed circuit board 7, on which are mounted a number of circuit parts (not shown) is incorporated in base unit 2.

As is illustrated in FIG. 1, computer 1 further comprises a flat-panel type display unit 8. Display unit 8 comprises a rectangular housing 9 and a flat liquid-crystal display 11 located within the housing 9. Housing 9 is composed of a base case 10a and a front case 10b, both shaped like a rectangular plate. These cases 10a and 10b are fastened together, by screws (not shown) at their four corners. Liquid-crystal display 11, which has a screen 12, is interposed between cases 10a and 10b. Screen 12 is exposed through a rectangular opening 13 of front case 10b.

As is evident from FIG. 1, display unit 8 is pivotally coupled to base unit 2. Display unit 8 rotates between a closed position where display unit 8 covers keyboard 5 and an open position for exposing keyboard 5 and screen 12 to operating computer 1, as arrow A. As long as display unit 8 remains in the closed position, its top is at the same level as the upper surface of top cover 4, and its left and right sides are level with those of top cover 4. In this condition, base unit 2 and display unit 8 form a relatively thin box, which is quite portable.

Display unit 8 has a first leg portion 15a and a second leg portion 15b. First leg portion 15a protrudes from a lower-left portion of the housing 9. Second leg portion 15b protrudes from a lower right portion of the housing 9. First leg portion 15a is mounted in first recess 6a and second leg portion 15b is mounted in second recess 6b, respectively.

Figure 2:
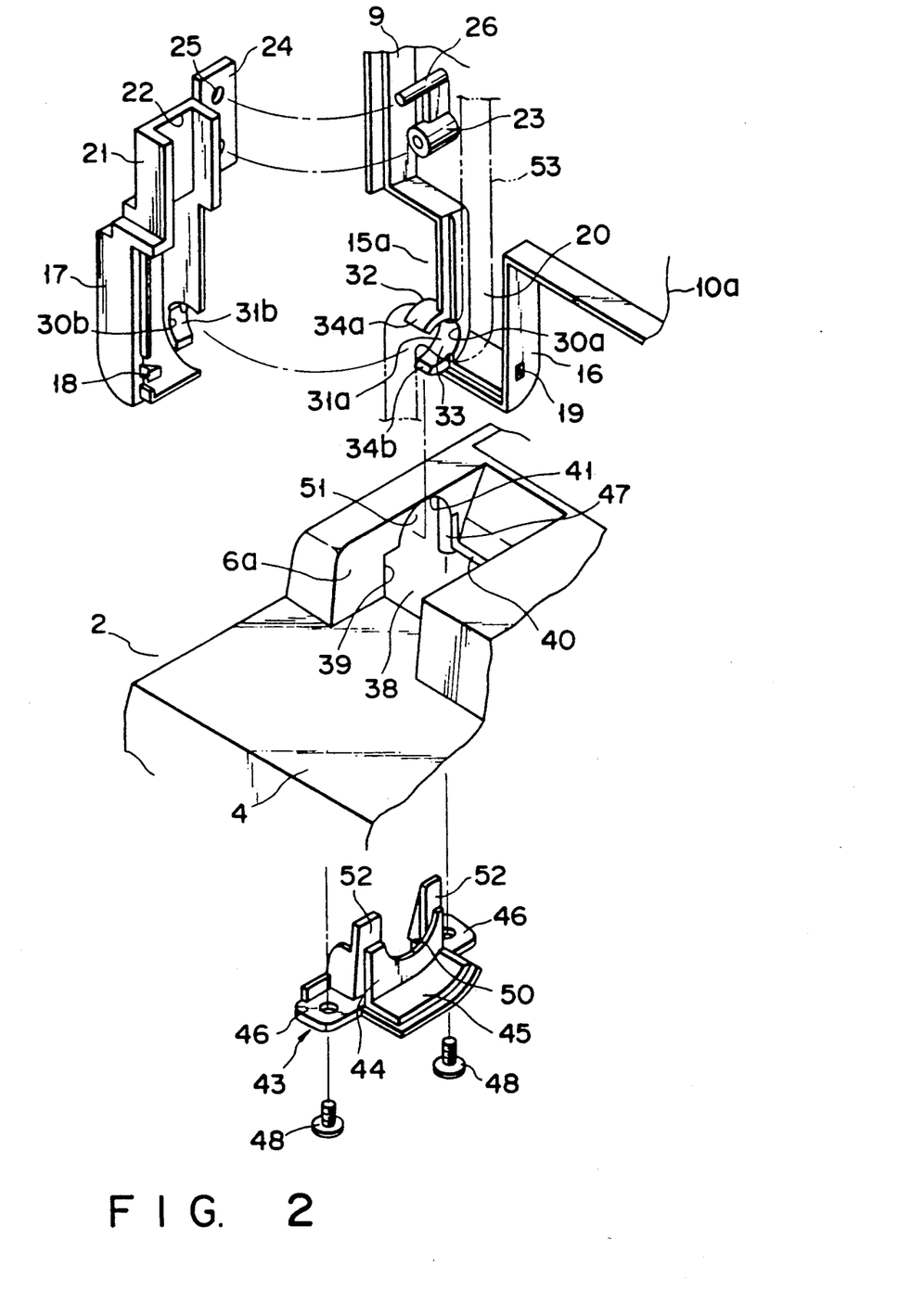
FIG. 2 is a perspective view showing a first recess of a base unit of the computer and an exploded view showing a first leg portion for connecting the display unit to a base unit.
Figure 8:
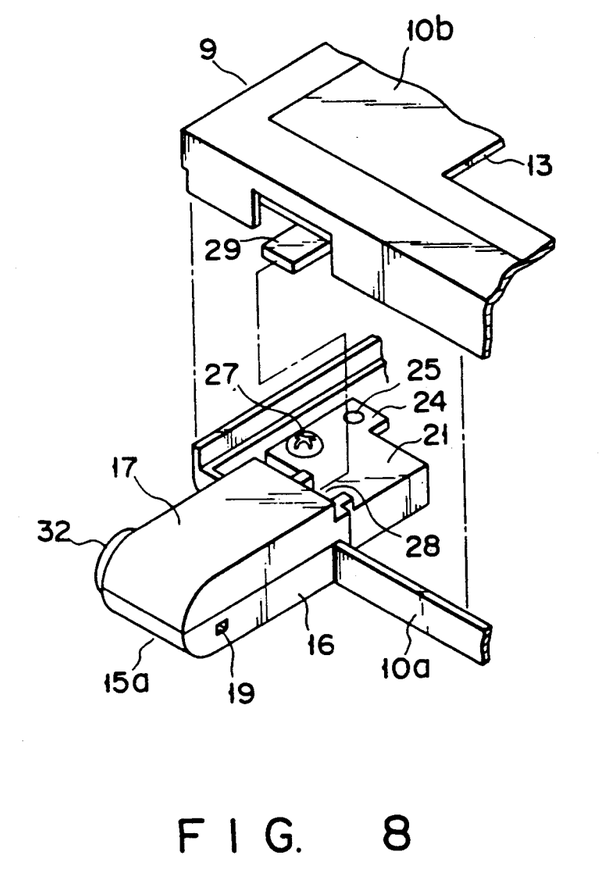
FIG. 8 is an exploded view showing the first leg portion which supports the display unit.

As is evident from FIGS. 2 and 8, first leg portion 15a has a rear leg segment 16 protruding from and conjoining base case 10a and a front leg segment 17 removably fastened to the front of rear leg segment 16. As FIG. 2 clearly shows, front leg segment 17 has a claw 18 projecting from the side which connects to rear leg segment 16. When front leg segment 17 is attached on rear leg segment 16, claw 18 engages a lock hole 19 formed in the inner side of rear leg segment 16, whereby segments 16 and 17 are fastened together, forming first leg portion 15a. Leg segments 16 and 17, thus fastened together, define a guide path 20.

The front leg segment 17 also has a guide portion 21 for guiding a cable 53 into the housing 9. Guide portion 21 has a communication port 22 at its tip. Port 22 opens to the interior of housing 9, thus allowing guide path 20 to communicate with the interior of housing 9. Segment 17 further has a fixing tongue piece 24 which is attached to guide portion 21 and aligns with a boss 23 protruding from base case 10a, and has a positioning hole 25. A positioning projection 26, protruding from base case 10a, is inserted in hole 25, thereby aligning front leg segment 17 with rear leg segment 16. As a result of this, leg segments 16 and 17 are firmly connected by a screw 27 set in screw engagement with bosses 23, thus forming leg portion 15a.

As is illustrated in FIG. 8, a stepped portion of front leg segment 17, which is continuous to guide portion 21, has a hole 28 opening into the interior of leg segment 17. A tongue piece 29, protruding from front case 10b, is inserted in hole 28, thus positioning front case 10b.

As may be understood from FIG. 2, leg segments 16 and 17 have, respectively, half-cylinders 31a and 31b, which are situated on the outer sides and connect to each other. Half-cylinders 31a and 31b define U-shaped notches 30a and 30b. These half-cylinders 31a and 31b form a hollow shaft 32 having a guide path 33. Guide path 33 communicates with guide path 20 defined by the leg segments 16 and 17.

Figure 7:
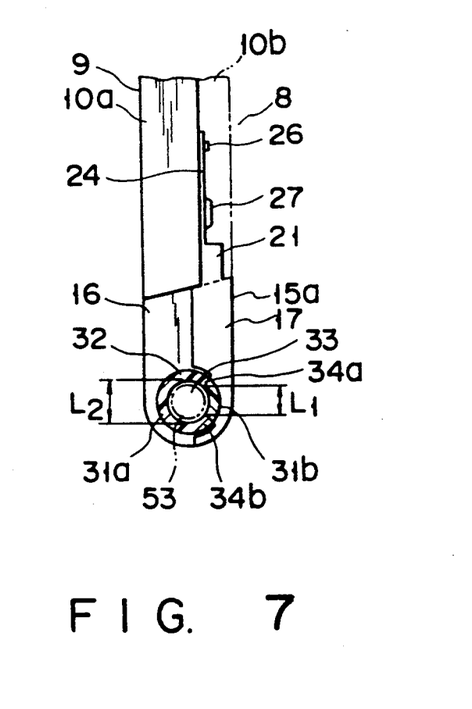
FIG. 7 is also a sectional view illustrating the shaft shown in FIGS. 2 and 3.

As is best shown in FIG. 2, half-cylinder 31a of rear leg segment 16 has two arcuate projections 34a and 34b opposing each other and extending into front leg segment 17. Thus, as is illustrated in FIG. 7, the distance L1 between the tips of arcuate projections 34a and 34b is shorter than the inside diameter L2 of hollow shaft 32.

First leg portion 15a extends into recess 6a of the base unit 2. As is evident from FIG. 2, the recess 6a has an opening 38. Opening 38 has two sections 39 and 40. Section 39 is cut in the outermost of the two opposing side walls which define the inner and outer faces of the recess 6a. Section 40 is made in the face which defines the bottom of the recess 6a. A receiving section 41 which is the upper edge of section 39 is arcuate, so that shaft 32 is rotatably fitted in opening 38. Thus, as is evident from FIG. 2, first leg portion 15a rotatably connects to base unit 2 along the axis of rotation of shaft 32. Also, the outermost side wall (outer face) of recess 6a is perpendicular to the axis of rotation of shaft 32.

A cover 43, which is made of a synthetic resin, is located in opening 38, extending from below top cover 4. Cover 43 is fastened to a wall defining a bottom of recess 6a. Cover 43 has a side wall 44 and a bottom wall 45 which are fitted in sections 39 and 40 of opening 38, respectively, with the side wall 44 being disposed perpendicular to the axis of rotation of shaft 32, and two flanges 46, connected to the front and rear edges of side wall 39, which are fastened to bosses 47 protruding downward from the inner surface of top cover 4, by screws 48.

An arcuate notch 50, into which shaft 32 is rotatably fitted, is cut in the upper edge of side wall 44 so as to oppose receiving section 41 in base unit 2. Notch 50 and the section 41 form a circular hole 51, through which the shaft 32 rotatably extends. A guide wall 52, which is taller than side wall 44 and also has an arcuate notch 50, is formed integral with wall 44.

Hole 51 communicates with guide path 20 formed in first leg portion 15a through guide path 33 formed in shaft 32. Hence, guide paths 20 and 33 and hole 51 connect the interior of base unit 2 to that of the housing 9. Cable 53 extends through paths 20 and 33 and hole 51, thus electrically connecting printed circuit board 7 to liquid-crystal display 11.

As is shown in FIG. 3, cable 53 is flexible, and has connectors 54a and 54b attached to its ends. Connectors 54a and 54b are elongated members larger than hole 51. Connector 54a extends into base unit 2 and connected to printed circuit board 7. Connector 54b extends into housing 9 and connected to liquid-crystal display 11.

Figure 9:
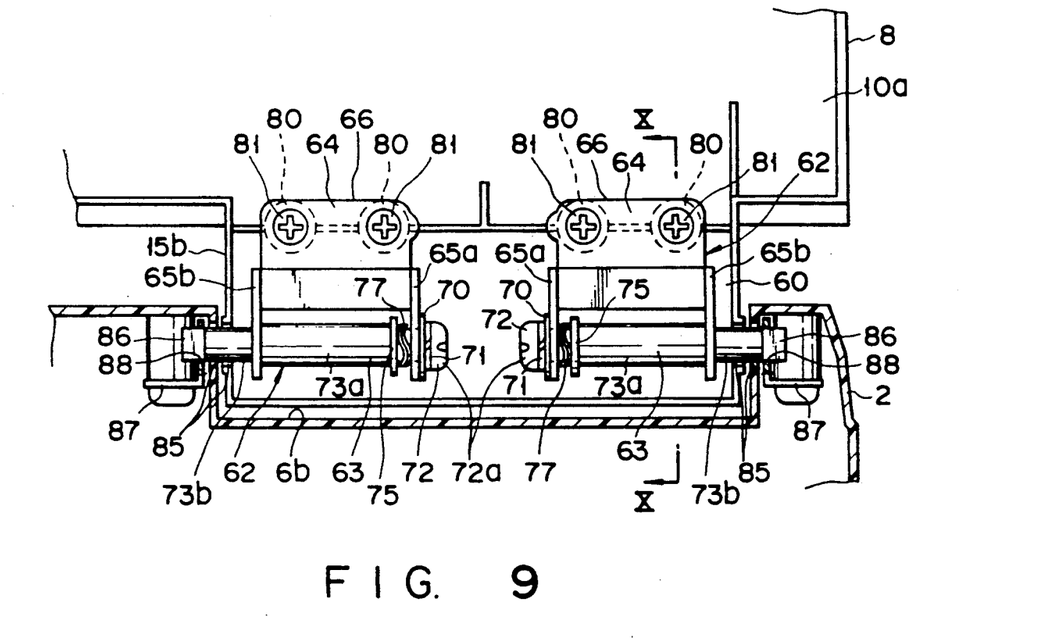
FIG. 9 is a sectional view of a second leg portion and a second recess.
Figure 10:
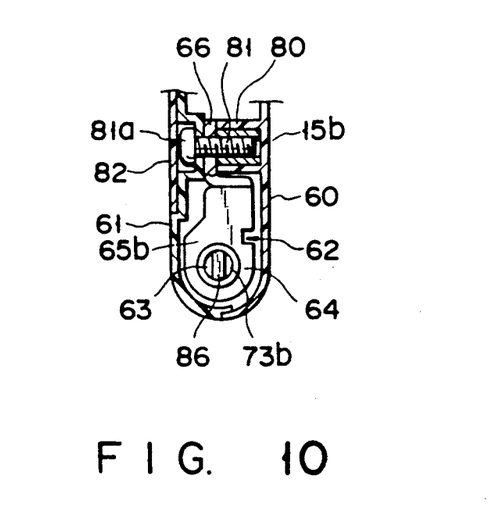
FIG. 10 is a sectional view, taken along line X—X in FIG. 9.

As is illustrated in FIGS. 9 and 10, second leg portion 15b has a rear leg segment 60 conjoining base case 10a and a front leg segment 61 conjoining front case 10b. Second leg portion 15b extends horizontally longer than first leg portion 15a. Second leg portion 15b contains a pair of hinge brake mechanisms 62, which support housing 9 in an arbitrary position between the closed position and the open position.

A first and a second hinge brake mechanisms 62 are located in inner and outer ends of second leg portion 15b, respectively. Hinge brake mechanisms 62 are designed not only to support housing 9, but also to hold housing 9 at any position between the closed position and the open position. Hinge brake mechanisms 62 are identical in structure, and only one of them will, therefore, be described in detail with reference to FIGS. 11 and 12.

Figure 11:
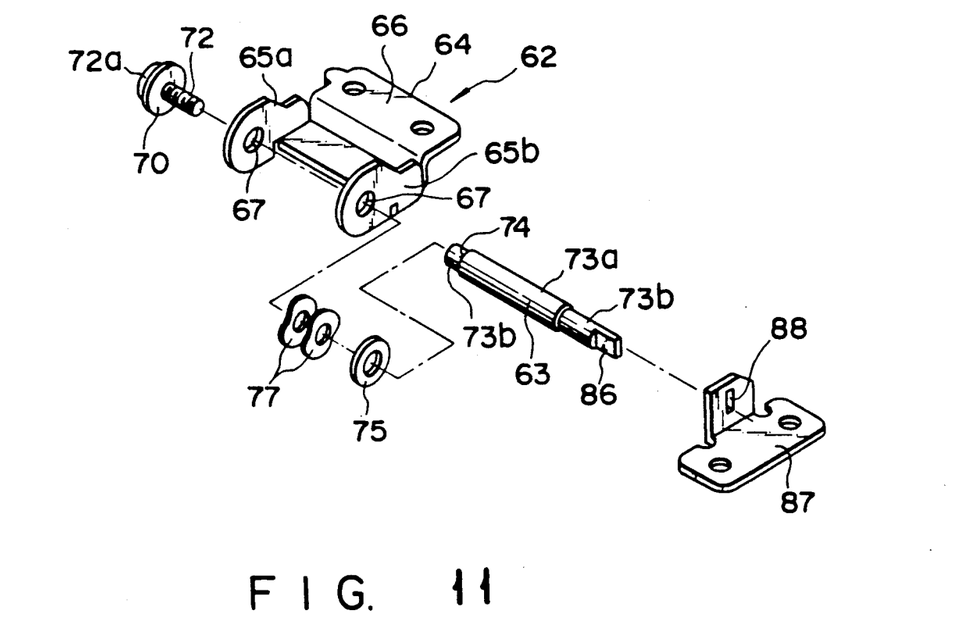
FIG. 11 is an exploded view illustrating the hinge brake mechanism shown in FIG. 9.
Figure 12:
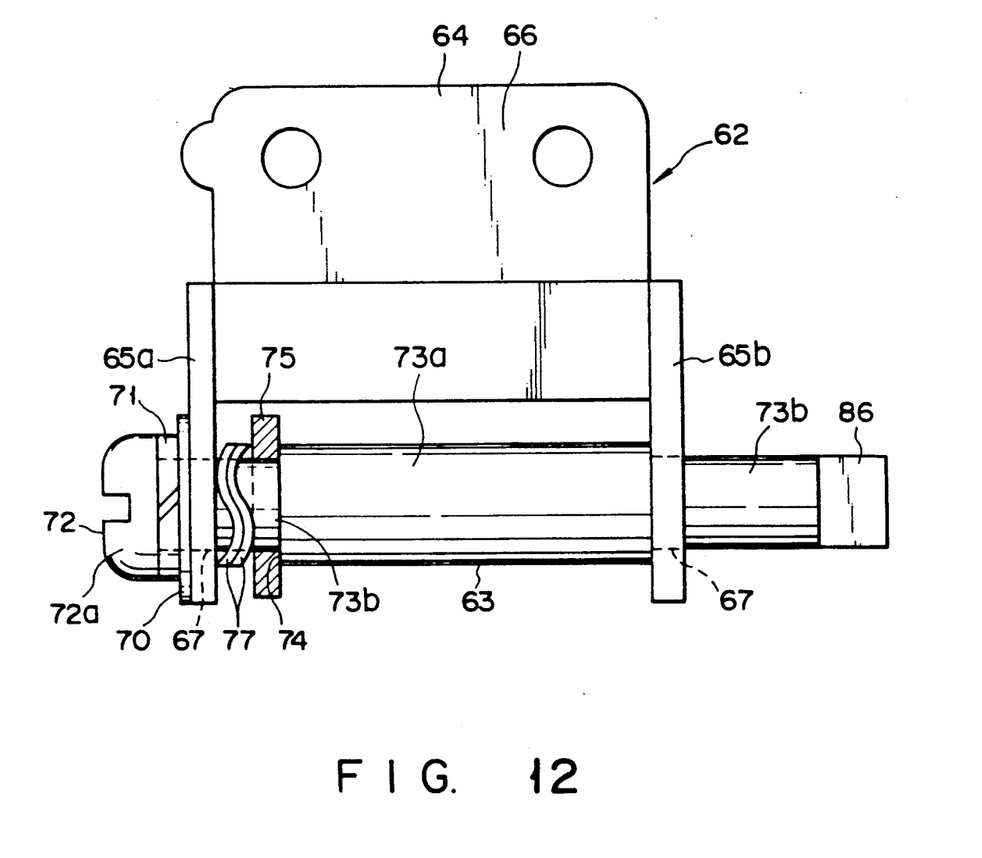
FIG. 12 is a plan view illustrating the hinge brake mechanism shown in FIG. 9.

As is illustrated in FIGS. 11 and 12, each hinge brake mechanism 62 has a straight shaft 63 and a bracket 64 made of metal and supporting shaft 63. Bracket 64 comprises a pair of support pieces 65a and 65b spaced apart in the axial direction of shaft 63, and a fixing section 66 connecting these pieces 65a and 65b. Support pieces 65a and 65b each have a hole 67, and are so positioned that the holes 67 are coaxial. An ends of shaft 63 are rotatably supported in these holes 67.

A left end of shaft 63 has a screw hole. A screw 72 is inserted in this screw hole, with a plain washer 70 and a spring washer 71 interposed between screw 72 and left end of shaft 63. Plain washer 70, spring washer 71, and head 72a of screw 72 have diameters larger than those of holes 67. Hence, plain washer 70 abuts on the outer side of support piece 65a, whereby washers 70, 71 and screw 72 prevent shaft 63 from slipping from hinge brake mechanism 62.

Shaft 63 has a thick portion 73a and two thin portions 73b extending from the ends of portion 73a. A first thin portion 73b is inserted in hole 67 of support pieces 65b. A second thin portion 73a is inserted in hole 67 of support piece 65a. A plain washer 75 having an outside diameter larger than the diameter of thick portion 73a is mounted on thin portion 73b and abuts a right end 74 of thick portion 73a. Two wave washers 77 having an outside diameter substantially the same as the diameter of thick portion 73a are mounted on thin portion 73b. Washers 77 compressed between plain washer 75 and support piece 65a of bracket 64. Two wave washers 77, which function as springs, abut plain washer 75 and support piece 65a, respectively. A friction force is thereby generated between plain washer 75 and bracket 64, restricting the rotation of shaft 63 which is supported by bracket 64.

In this embodiment, two wave washers 77 are used to restrict the rotation of shaft 63. Alternatively, one wave washer, or three or more wave washers may be used for the same purpose in the present invention.

As is shown in FIG. 9, two pairs of bosses 80 protrude from the inner surface of rear leg segment 60. Fixing sections 66 of first and second hinge brake mechanisms 62 are fastened to first and second bosses 80, respectively, by screws 81. Both hinge brake mechanisms 62 are connected to housing 9. As is shown in FIG. 10, one of screws 81 which fasten either fixing section 66 to bosses 80 passes through the hole cut in front leg segment 61. Screws 81 fastens front leg segment 61 to rear leg segment 60. A cover 82 is removably connected to front leg segment 61, thus concealing heads 81a of screws 81.

As is illustrated in FIG. 9, one of thin portions 73b of either shaft 63 extends into base unit 2 through hole 85 made in the side wall of base unit 2. An end 86 of portion 73b which is located within base unit 2 has a polygonal cross section. An end 86 of thin portion 73b is fitted in a corresponding hole 88 made in a support 87 which protrudes downward from the top wall of base unit 2. Thus, shaft 63 of hinge brake mechanism 62 cannot rotate.

Display unit 8 has leg section 15a connected to the base unit 2 by shaft 32 held in hole 51 as is shown in FIGS. 2 and 3, and has leg section 15b connected to base unit 2 by hinge brake mechanisms 62 as is shown in FIG. 9. Display unit 8 is thus rotatably supported on base unit 2.

It will now be explained how flexible cable 53, with connectors 54a and 54b attached to opposite ends, is guided from base unit 2 into housing 9 of display unit 8, with display unit 8 disconnected from base unit 2.

First, front case 10b and front leg segment 17 are removed from base case 10a of housing 9. Also, top cover 4 is detached from bottom case 3 and cover 43 is removed from top cover 4, thus allowing access to the interior of base unit 2 through opening 38 which is formed in the outermost of two opposing side walls which define the outer and inner faces of first recess 6a, and the wall which defines the bottom of first recess 6a. Opening 38 is large, allowing connector 54a, which attaches to printed circuit board 7, to pass through opening 38. The end portion of cable 53 to which the connector 54a is connected is inserted into base unit 2 through opening 38.

Next, cover 43 is fitted into opening 38 from within top cover 4, with cable 53 resting in U-notch 50. Flanges 46 of cover 43 are then fastened to bosses 47 by screws 48. As a result, cover 43 is secured to top cover 4 of base unit 2, whereby U-notch 50 of cover 43 and receiving section 41 of top cover 4 define hole 51. Cable 53 passes through hole 51.

Then, cable 53 is pushed into half-cylinder 31a of rear leg segment 16, more precisely, into the gap between arcuate projections 34a and 34b. Once cable 53 is thus pushed into half-cylinder 31a, it cannot easily slip out of half-cylinder 31a, since distance L2 between the tips of arcuate projections 34a and 34b is shorter than inside diameter L1 of hollow shaft 32. Rear leg segment 16 is inserted into first recess 6a, thus fitting cylinder 31a into hole 51.

Thereafter, cable 53 is guided through rear leg segment 16 to a position above base case 10a of display unit 8. This rear leg segment 16 is then fastened to front leg segment 17 by screw 27. The formation of first leg portion 15a therefore is completed by fastening the segments, and cable 53 is guided into guide path 20, through guide portion 21 of front leg segment 17, and, together with connector 54b, from communication port 22, provided at the top of guide portion 21 to a position within the housing 9. This is clearly illustrated in FIGS. 2 and 3. The connector 54b is then electrically connected to display 11 as illustrated in FIG. 3.

When leg segments 16 and 17 are brought into contact with each other, half-cylinder 31b of front leg segment 17 is brought into contact with half-cylinder 31a of leg segment 16, thereby forming hollow shaft 32 having guide path 33. Hollow shaft 32 is then inserted into hole 51 defined by U-notch 50 of cover 43 and receiving section 41 of top cover 4 as shown in FIG. 3. Consequently, cable 53 passes between top cover 4 of base unit 2 to housing 9 of display unit 8 through guide path 33 of hollow shaft 32 and guide path 20 of first leg portion 15a as also shown in FIG. 3. After leg segments 16 and 17 are connected to each other, first leg portion 15a thereof can be inserted into first recess 6a.

Further, connector 54a of cable 53 is electrically connected to printed circuit board 7, before top cover 4 is attached to bottom case 3.

As may be understood from the above, it suffices to pass flexible cable 53 through opening 38 of top cover 4, thereby guiding cable 53 from base unit 2 into display unit 8. Cable 53 need not be passed through guide path 33 or hole 51. For example since opening 38, into which cable 53 is inserted, consists of opening section 39 in the side wall of first recess 6a and opening section 40 in the bottom of recess 6a, the overall size of the entire opening 38 is large as evident in FIG. 2. Therefore, it is easy to insert cable 53 from base unit 2 into display unit 8 through opening 38.

Furthermore, since guide path 33 and hole 51 are formed of respective elements half-cylinder 31a, half-cylinder 31b, receiving section 41, and U-notch 50 of cover 43, these elements may be separated from each other when cable 53 is to be inserted into guide path 33, provided in hollow shaft 32, and hole 51 as illustrated in FIGS. 2 and 3. Therefore, cable 53 is easily and neatly guided in spite of connectors 54a and 54b fastened to the opposite ends of cable 53, both larger than the diameters of path 33 and hole 51. Such cumbersome manual work as fastening connectors 54a and 54b to cable 53 after guiding cable 53 through first leg portion 15a is completely unnecessary, which facilitates the easy assembling of computer 1.

In this embodiment, front leg segment 17 does not conjoin front case 10b. But even though front leg segment 17 conjoins front case 10b, the same object and advantage will be achieved.

Additional advantages and modifications will readily occur to those skilled in the art. Therefore, the invention in its broader aspects is not limited to the specific details, shown and described herein. Accordingly, various modifications may be made without departing from the spirit or scope of the general inventive concept as defined by the appended claims and their equivalents.

What is claimed is:

1. A portable electronic apparatus comprising:
   a display unit comprising a leg portion having a cable guide path therein;
   a base unit comprising a leg mounting portion for receiving the leg portion, the leg mounting portion including a bottom mounting wall having a bottom opening and a side mounting wall having a side opening, the side opening being continuous with the bottom opening;
   a cover comprising a bottom support wall for covering the bottom opening and a side support wall cooperating with the side mounting wall of the leg mounting portion to form a cable guide hole; and
   a cable comprising a first end having a first connector electrically connected to the display unit and a second end having a second connector electrically connected to the base unit, the cable passing through the cable guide hole and the cable guide path.

2. A portable electronic apparatus according to claim 1, wherein the base unit further comprises a first top, a second top, and a bottom all being substantially parallel to each other, a top surface of the first top being an uppermost surface of the base unit and the second top being at a position between said first top and said bottom, and an upper surface of the bottom support wall of the cover being flush with a top surface of the second top when the cover is secured to the leg mounting portion.

3. A portable electronic apparatus according to claim 2, wherein a top surface of the bottom mounting wall of the leg mounting portion is flush with the top surface of the second top of the base unit, and the upper surface of the bottom support wall of the cover is flush with the top surface of the bottom mounting wall of the leg mounting portion when the cover is secured to the leg mounting portion.

4. A portable electronic apparatus according to claim 3, wherein the bottom mounting wall of the leg mounting portion conjoins with the second top of the base unit.

5. A portable electronic apparatus according to claim 4, wherein the bottom mounting wall of the leg mounting portion conjoins with the side mounting wall of the leg mounting portion.

6. A portable electronic apparatus according to claim 1, wherein the side support wall of the cover comprises a side surface being flush with the side mounting wall of the leg mounting portion.

7. A portable electronic apparatus according to claim 1, wherein the first top of the base unit further comprises a bottom surface, the cover being removably secured to the leg mounting portion on the bottom surface side of the first top of the base unit.

8. A portable electronic apparatus according to claim 1, wherein the leg mounting portion further comprises a second side mounting wall being opposite to the side mounting wall of the leg mounting portion, and a rear wall being connected to the side mounting wall and the second side mounting wall forming a U-shape.

9. A portable electronic apparatus according to claim 8, wherein the rear wall of the leg mounting portion conjoins with the side mounting wall and the second side mounting wall of the leg mounting portion.

10. A portable electronic apparatus according to claim 1, wherein the display unit further comprises a rear case, a rear leg segment conjoining with the rear case, a front case being removably attached to the rear case and a front leg segment being removably attached to the front case and the rear leg segment, the front leg segment cooperating with the rear leg segment to form the cable guide path.

11. A portable electronic apparatus according to claim 10, wherein the front segment comprises a front half-cylinder and the rear segment comprises a rear half-cylinder, the front half-cylinder cooperating with the rear half-cylinder to form the cable guide path and a hollow shaft for guiding the cable.

12. A portable electronic apparatus according to claim 11, wherein the rear half-cylinder further comprises a pair of opposite arcuate ends, a distance between the opposite arcuate ends being smaller than an inner diameter of the hollow shaft.

13. A portable electronic apparatus according to claim 1, wherein the base unit further comprises a keyboard and the display unit is rotatable between a closed position wherein the keyboard is covered by the display unit and an open position allowing operation of the keyboard.

14. A portable electronic apparatus according to claim 13, wherein the display unit further comprises a second leg portion having locking means for maintaining the display unit in an arbitrary position between the open and the closed positions, the base unit further comprising a second leg mounting portion for receiving the second leg portion.

15. A portable electronic apparatus according to claim 1, wherein the bottom opening of the bottom mounting wall is larger than the first connector thereby allowing the first connector to pass through the bottom opening of the bottom mounting wall and the cable guide path is smaller than the first connector thereby preventing the first connector to pass through the cable guide path.

16. A portable electronic apparatus comprising:
   a display unit comprising a leg portion having a cable guide path therein;
   a base unit comprising:
      a first top, a second top and a bottom all being substantially parallel to each other, a top surface of the first top being an uppermost surface of the base unit and the second top being at a position between said first top and said bottom, and a leg mounting portion for receiving the leg portion, the leg mounting portion including a bottom mounting wall having a bottom opening and a side mounting wall having a side opening, the side opening being continuous with the bottom opening;

a cover comprising a bottom support wall for covering the bottom opening and a side support wall cooperating with the side mounting wall of the leg mounting portion to form a cable guide hole, an upper surface of the bottom support wall of the cover being flush with a top surface of the second top when the cover is secured to the leg mounting portion; and a cable comprising a first end having a first connector electrically connected to the display unit and a second end having a second connector electrically connected to the base unit, the cable passing through the cable guide hole and the cable guide path.

17. A portable electronic apparatus according to claim 16, wherein the display unit comprises a display screen, the display unit being rotatable between a closed position wherein the second top is covered by the display unit and an open position for viewing the display screen.

18. A portable electronic apparatus according to claim 17, wherein the display unit further comprises a second leg portion having locking means for maintaining the display unit in an arbitrary position between the open and the closed positions.

19. A portable electronic apparatus according to claim 18, wherein the bottom mounting wall of the leg mounting portion conjoins with the side mounting wall of the leg mounting portion and a top surface of the bottom mounting wall of the leg mounting portion is flush with the top surface of the second top of the base unit.

20. A portable computer comprising:

a cable having at least one electrical connector;

a base unit comprising a leg mounting portion having a side surface and an opening in the side surface for guiding the cable;

a display unit comprising a leg portion having a cable guide path, the display unit connected to the base unit along an axis, the side surface being disposed perpendicular to the axis; and a wall, disposed perpendicular to the axis and removably covering the opening, the wall cooperating with the side surface to form a cable guide hole being smaller than the opening, the cable being guided through the cable guide path and the cable guide hole.

21. A portable electronic apparatus comprising:

a display unit comprising a leg portion having a cable guide path therein, a base case and a front case removably attached to the base case, the leg portion having a rear leg segment conjoining with the base case and a front leg segment removably connected to the rear leg portion and the front case;

a base unit comprising a top cover having a leg mounting portion for mounting the leg portion, the leg mounting portion having an opening;

a cover for covering a portion of the opening of the leg mounting portion, the cover comprising a cable guide portion; and a cable, passing though the cable guide path and the cable guide portion, the cable comprising a first end having a first connector electrically connecting to the display unit and a second end having a second connector electrically connected to the base unit.

* * * * *